W. P. DUNLAP.
WAGON REACH ADJUSTER.
APPLICATION FILED SEPT. 30, 1909.
959,483.
Patented May 31, 1910.
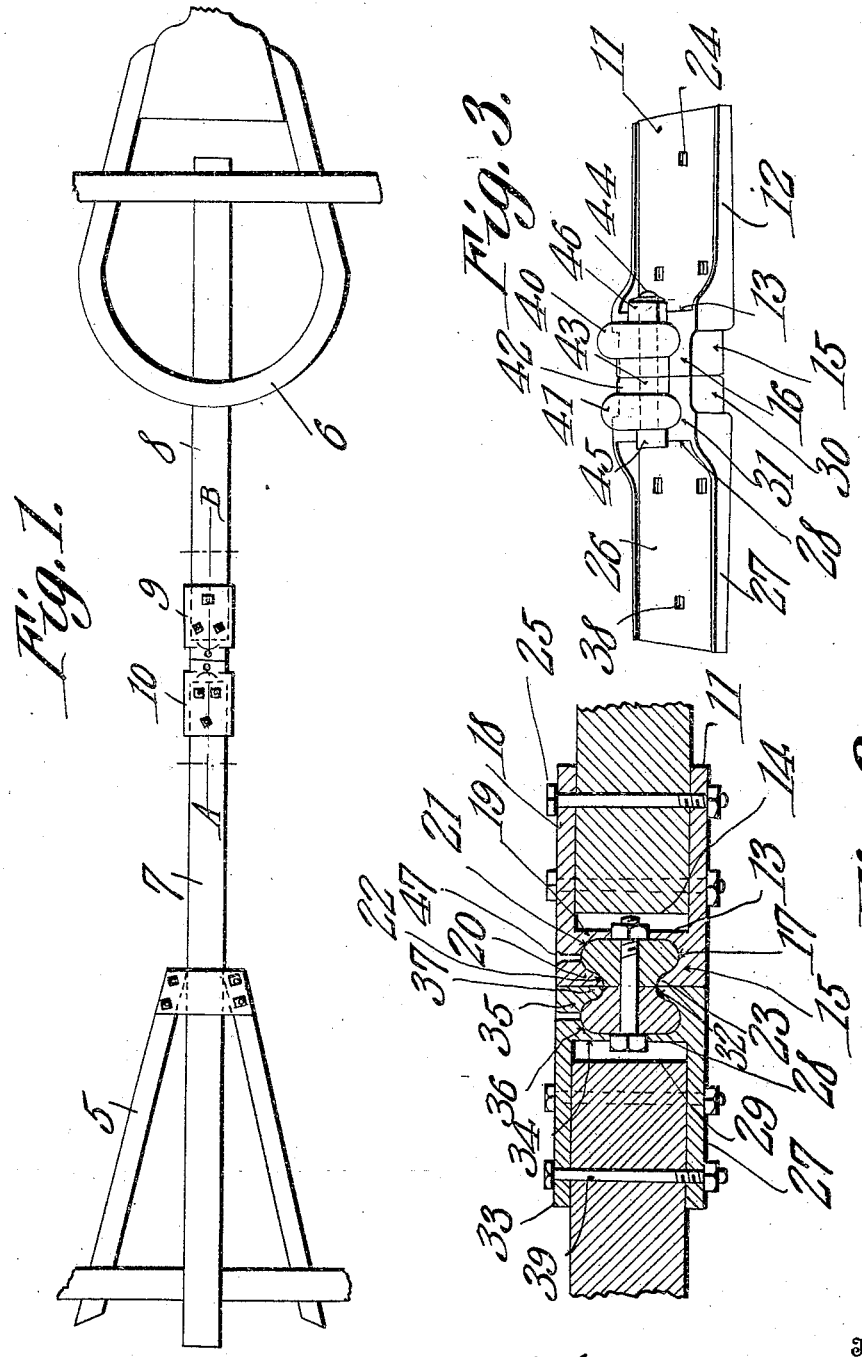
Witnesses
E. J. Stewart
Francis Boyle
Inventor
William P. Dunlap.
By C. A. Snow & Co.
Attorneys

UNITED STATES PATENT OFFICE.

WILLIAM P. DUNLAP, OF MAQUOKETA, IOWA.

WAGON-REACH ADJUSTER.

959,483. Specification of Letters Patent. Patented May 31, 1910.

Application filed September 30, 1909. Serial No. 520,325.

*To all whom it may concern:*

Be it known that I, WILLIAM P. DUNLAP, a citizen of the United States, residing at Maquoketa, in the county of Jackson and State of Iowa, have invented a new and useful Wagon-Reach Adjuster, of which the following is a specification.

My invention relates to wagon reaches and has for an object to provide a simple and practical device of this character which will yield to torsional strain and will not split or be snapped off when the wagon wheels drop into a deep rut or hole in the road bed.

Another object is to provide a reach which will have the resiliency of an ordinary reach and will be reinforced at its central point to resist bending strain.

A further object is to provide a sectional reach that will be durable, inexpensive to manufacture and devoid of complicated parts.

In the accompanying drawing, forming part of this specification, Figure 1 is a plan view of a reach constructed in accordance with my invention, in applied position. Fig. 2 is a longitudinal sectional view taken on the line A—B of Fig. 1. Fig. 3 is a detail perspective view showing the lower halves of the sockets connected by their ball bearings.

Like characters of reference designate similar parts in the views shown.

Referring now to the drawings, a reach is shown connecting the rear hounds 5 and front sway bar 6 of the wagon running gear in the usual manner. The reach comprises a pair of alined bars 7 and 8 which are preferably rectangular in contour and cross section and have their opposed ends swivelly connected together approximately midway between the rear hounds and front sway bar of the running gear. Arranged upon the opposed ends of the bars 7 and 8 are sockets 9 and 10, each of which is preferably formed in two similar halves. The lower half of the socket 9 consists of a securing plate 11 adapted to bear against the bottom face of the bar 8 and having flanges 12 formed on its longitudinal edges to clamp the lateral sides of the bar. A head 13 connects the end edges of the securing plate and flanges and forms a housing for the lower half of the end face 14 of the bar. Projecting from the head 13 is a semi-circular projection 15 in the flat top face 16 of which is formed a semi-circular seat 17 to receive a ball bearing. The top half of the socket 9 is formed similar to the above described bottom half; that is it includes a securing plate 18 having an integral head 19 to house the top half of the end face 14 and a semi-circular projection 20 provided with a semi-circular seat 21 that coöperates with the seat in the lower half of the socket to form a raceway for the ball bearing. A groove 22 formed in the projection 20 coöperates with a similar groove 23 formed in the projection 15 to form a cylindrical bearing, the purpose of which will presently appear. A plurality of openings 24 are formed in the securing plates of the top and bottom halves of the sockets through which bolts 25 are passed to removably secure the socket to the end of the bar 8. The bottom half of the socket 10 comprises a securing plate 26 having flanges 27 to clamp the sides of the bar 7. A head 28 connects the end edges of the securing plate and flanges and forms a housing for the lower half of the end face 29 of the bar. A semi-circular projection 30 projects from the head and is provided on its flat top face with a semi-circular seat 31 to receive a ball bearing. A groove 32 is formed transversely the projection and communicates at one end with the seat 31. The top half of the socket 10 is formed similar to the bottom half and includes a securing plate 33 terminating in a head 34 that forms a housing for the top half of the end face 29. A semi-circular projection 35 projects from said head and is provided with a semi-circular seat 36 that coöperates with the seat 31 formed in the lower half to form a raceway to receive a ball bearing. A groove 37 communicates with the seat 36 and coöperates with the groove 32 formed in the bottom half of the socket to form a cylindrical bearing. A plurality of openings 38 are formed in the securing plates of the socket 10, through which bolts 39 are passed to removably secure the socket to the bar 7.

Seated in the raceways formed in the sockets 9 and 10 are ball bearings 40 and 41 hereinafter referred to as bearing heads. Each ball bearing is preferably flattened, as shown, and is provided with an annular collar 42 having a flattened working face 43 to bear against the working face of the opposed ball bearing collars. Loosely engaged centrally through the ball bearings is a bolt 44 or like retaining element terminating at one end in the squared head 45 and at the other end in a threaded shank upon which travels a retaining nut 46 adapted to bear against the opposed face of the ball bearing 40 and hold the working faces of the collars in contact. The collars 42 of the ball bearings are journaled in the cylindrical bearings or journal boxes formed by the before mentioned grooves of the sockets and serve to properly position the ball bearings relatively to each other.

It will be seen that the ball bearings are free to rotate independently in the raceways formed in the sockets 9 and 10 so that the rear part of the running gear may be rotated in a complete circle, if desired, without interfering with the position of the forward part. It is thus evident that the wheels of a wagon may drop into a rut without subjecting the reach to the racking strain usually resulting from rough conditions of service. In order that the ball bearings may be kept lubricated, oil holes 47 are formed in the top halves of the sockets 9 and 10 and communicate with the raceways formed therein.

It is evident that, as the end faces of the bars 7 and 8 are housed by the metal sockets 9 and 10 and as the securing plates of the latter extend for a considerable distance back from the end faces of the bars to which they are securely bolted, the reach will be reinforced and strengthened at its middle point or point of greatest strain to resist lateral or bending strains.

From the foregoing description, taken in connection with the accompanying drawing, it is thought that the construction and operation of my invention will be easily understood without a more extended explanation, it being understood that various changes in the form, proportion and minor details of construction may be made without sacrificing any of the advantages or departing from the spirit of the invention.

What is claimed is:

1. A wagon reach consisting of a pair of alined bars, sockets secured to the opposed ends of said bars, bearing heads working in said sockets, and a retaining element loosely engaged through said bearing heads whereby to connect said bars.

2. In a wagon reach, a pair of alined bars, sockets removably secured to the opposed ends of said bars, bearing heads working in said sockets, each of said bearing heads having a lateral projection provided with a flat working face adapted to bear against the projection of the opposed bearing head, and a retaining element connecting said bearing heads.

3. In a wagon reach, a pair of alined bars, sockets detachably secured to the opposed ends of said bars, each of said sockets having a flat working face for contact with the opposed socket, bearing heads working in said sockets, and a retaining element passed centrally through said bearing heads whereby to hold said sockets in contact.

4. In a wagon reach, a pair of alined bars, a pair of sockets disposed on the opposed end faces of said bars, bearing heads working in said sockets, said bearing heads being provided with annular bearing collars on their opposed surfaces adapted for contact, and a retaining element connecting said bearing heads.

In testimony that I claim the foregoing as my own, I have hereto affixed my signature in the presence of two witnesses.

WILLIAM P. DUNLAP.

Witnesses:
  J. F. TAYLOR,
  GEO. E. DUNLAP.